J. L. FAY.
CONDUIT.
APPLICATION FILED DEC. 15, 1915.
1,235,671.
Patented Aug. 7, 1917.
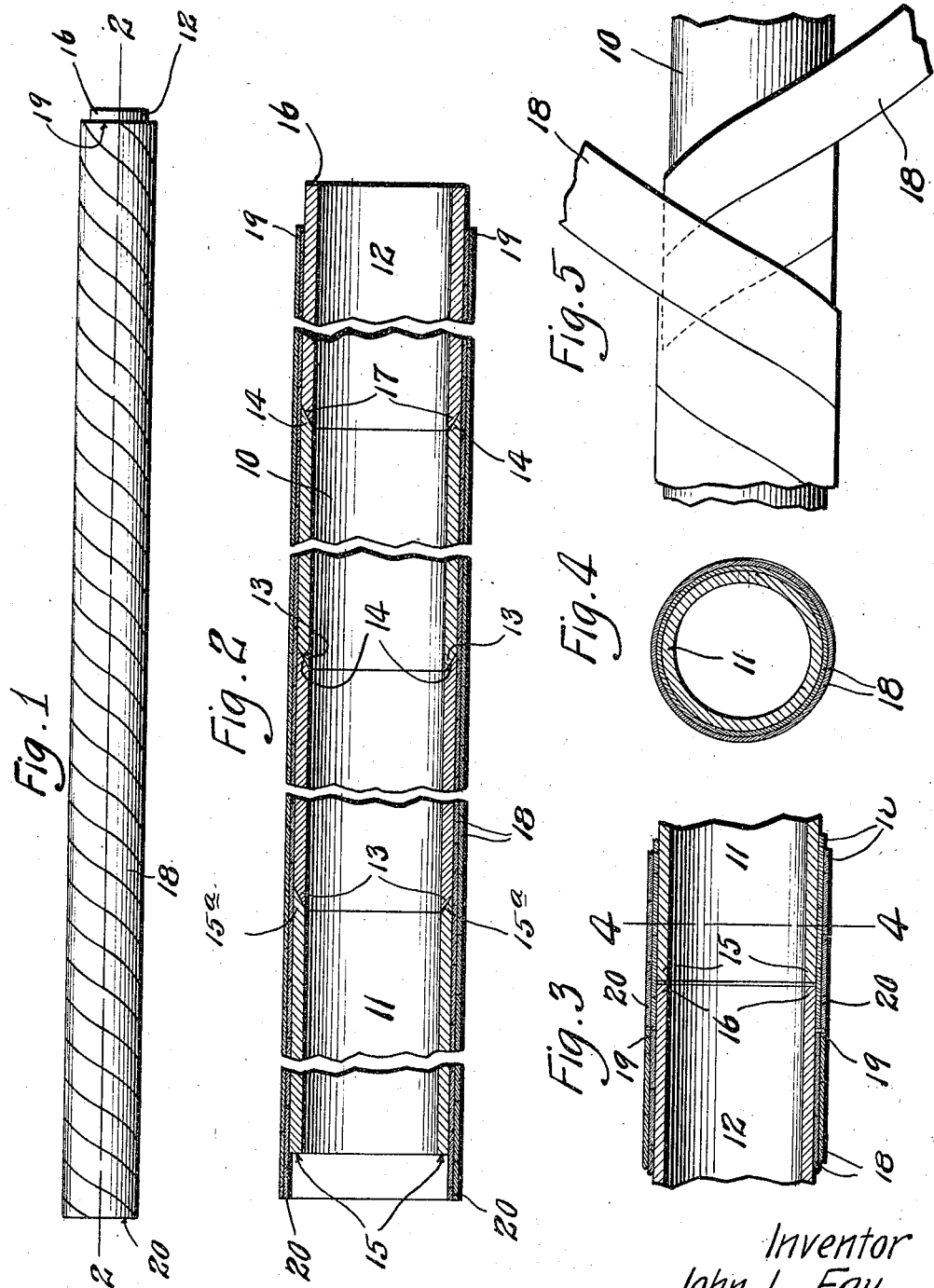
Inventor
John L. Fay

UNITED STATES PATENT OFFICE.

JOHN L. FAY, OF ST. LOUIS, MISSOURI, ASSIGNOR OF ONE-THIRD TO A. C. EINSTEIN AND ONE-THIRD TO H. W. EALES, BOTH OF ST. LOUIS, MISSOURI.

CONDUIT.

1,235,671. Specification of Letters Patent. Patented Aug. 7, 1917.

Application filed December 15, 1915. Serial No. 67,046.

*To all whom it may concern:*

Be it known that I, JOHN L. FAY, a citizen of the United States residing at St. Louis, Missouri, have invented a certain new and useful Improvement in Conduits, of which the following is a full, clear, and exact description, such as will enable others skilled in the art to which it appertains to make and use the same, reference being had to the accompanying drawings, forming part of this specification.

My invention relates to conduits of the type generally employed for containing under-ground cables, the principal objects of my invention being to generally improve upon and simplify the existing types of conduits to which my invention relates; to provide a unit or sectional construction which in addition to facilitating and lessening the cost of manufacture, permits the conduit sections to be made in such lengths as may be practicable or desired.

Further objects of my invention are to provide conduit members made up of sections of fire-proof earthen material and all the sections of each member being inclosed in one or more layers of suitable moisture-proof insulating material; to provide a construction whereby the formation of male and female joints at the meeting ends of the conduit sections can be formed without the use of special tools; and further, to provide a construction whereby the joints between the sections of the conduit members and between the abutting ends of said members are comparatively smooth, thereby maintaining the continuity of the smooth finished inner surfaces of the conduit sections, thus permitting the contained cable to expand and contract under ordinary service conditions or be pulled through the conduit without undue injury to the surfaces of the lead sheath of said cable.

A further object of my invention is to provide a comparatively simple and inexpensive conduit having a comparatively strong inner wall of non-conducting fireproof material and to inclose said inner wall with one or more layers of moisture-proof insulating material, preferably fibrous sheets impregnated or treated with a suitable liquid composition, preferably having preservative qualities, such construction being particularly effective in protecting the lead sheath of the inclosed cable from stray or return currents from electrically operated street railway systems or other adjacent structures which employ electricity in their operation.

With the foregoing and other objects in view my invention consists in certain novel features of construction and arrangement of parts, hereinafter more fully described, claimed and illustrated in the accompanying drawings, in which—

Figure 1 is a side elevational view of a conduit member of my improved construction.

Fig. 2 is an enlarged sectional view taken approximately on the line 2—2 of Fig. 1 with parts broken away.

Fig. 3 is a sectional view taken through the adjacent ends of a pair of conduit members and showing the joint between same.

Fig. 4 is a cross section taken approximately on the line 4—4 of Fig. 3.

Fig. 5 is an elevational view illustrating the preferred arrangement of the insulating sheath or wrapping of the conduit.

As illustrated in the accompanying drawings, the main body of each conduit member is made up of a series of intermediate sections or units 10 and a pair of end sections 11 and 12. These units or sections are tubular in form, have the same internal and external diameters, and are preferably formed of earthen material, such as clay, a combination of cement mineral wool and a suitable binder or any similar earthen material which can be shaped while in plastic or semi-plastic condition and which will harden when thoroughly dried or burned.

In the event that the sections are made from clay or like material, the inner or outer surfaces thereof may be glazed, if desired.

One end of the wall of each of the intermediate sections 10 is beveled or coned as designated by 13 and the opposite end of said wall is correspondingly beveled or counter-sunk as designated by 14, and thus when the adjacent ends of a pair of intermediate sections are brought together a comparatively tight joint is formed and as the end of one section is centered in the adjacent end of the other, the meeting edges on the interior of the structure are maintained in circumferential alinement with the result that the continuity of the smooth inner surfaces of the sections is maintained.

The outer end 15 of the wall of the end section 11 is straight and occupies a plane at right angles to the axis of said section while the opposite or inner end is beveled or counter-sunk as designated by 15ª in order to receive the corresponding coned end of the intermediate sections 10.

The outer end 16 of the wall of end section 12 is made straight and disposed in a plane at right angles to the axis of said outer section and the inner end of this section is beveled or coned as designated by 17 so as to fit in the corresponding counter-sunk end of one of the intermediate sections.

After a number of intermediate sections and a pair of the end sections have been properly assembled to form a conduit member of the desired length, the entire structure is covered with one or more layers 18 of insulating material. This coating or sheathing of insulation in addition to holding the members 10, 11 and 12 in assembled relation serves to protect the lead sheath of the cable which occupies the conduit from stray or return currents of electric street railways and the like.

The outer coating of insulation is preferably made up of strips or sections of fibrous material, such as comparatively heavy paper treated or impregnated with asphaltum or a suitable preservative, and as illustrated in Fig. 5 one strip or section of the material is wound angularly in one direction directly on the outer surfaces of the sections 10, 11 and 12 and the second layer is wound angularly in the opposite direction.

The composition utilized in treating the fibrous layers of material which form the covering of the conduit as just described preferably includes a suitable adhesive and an ingredient which is insoluble when dry, and thus after the fibrous material has been properly applied and becomes dry it effectually retains its position on the inner sectional wall of the conduit and likewise protects said inner wall against moisture which may be present in the earth in which the conduit is laid.

In applying the outer coating of insulating material, the latter is started a short distance from the outer end of one of the end members, thereby forming a rabbet or shoulder 19 at one end of the conduit member and the covering is extended a corresponding distance beyond the end of the opposite end member as designated by 20 to form a flange which when two of the conduit members are assembled engages the rabbet or shoulder 19 at the end of the adjacent member. Such construction provides male and female joints for the meeting ends of the conduit sections and permits the adjacent ends of end units or sections 11 and 12 to butt directly against each other.

By virtue of my improved construction the joints between the ends of the conduit members are made without the use of special tools and the laying of the conduit members together in the trench is greatly facilitated.

Further, such construction insures perfect butt joints between the ends 15 and 16 of the inner shell of the conduit and consequently the continuity of the smooth inner surface of the completed conduit is preserved.

Conduit members constructed in accordance with my invention are comparatively simple, can be easily and cheaply manufactured, can be made in any desired length by reason of their special structure and the contained cable and its lead sheathing is effectually insulated from stray or return currents and likewise protected against moisture.

My improved construction does not permit the lead sheath of the cable to come in contact with the composition used in impregnating the fibrous material utilized as the outer shell of the conduit and the practically smooth inner surface of the inner shell permits the contained cable to expand and contact or to be drawn through the conduit without undue injury to the lead sheathing of said cable.

It will be readily understood that minor changes in the size, form and construction of the various parts of my improved device may be made and substituted for those herein shown and described, without departing from the spirit of my invention, the scope of which is set forth in the appended claims.

I claim:

1. The hereindescribed conduit member comprising a series of inner tubular sections of fire-proof material, one end of each section being tapered and the other end being countersunk so as to produce tapered joints between said sections when the same are assembled for use, and a covering of non-conducting material for said tubular sections, which covering maintains the tubular sections forming the conduit member in assembled relation, the ends of the inner sectional member and said covering being offset with respect to each other to form an internally arranged shoulder at one end of the conduit and an externally arranged shoulder at the other end.

2. The hereindescribed conduit member comprising a series of inner tubular sections of fireproof material the ends of which are shaped so as to produce tapered joints between the sections, and an outer covering of moisture-proof material, the ends of the inner sectional member and covering being offset with respect to each other to form an internally arranged shoulder at one end of the conduit and an externally arranged shoulder at the other end.

3. The hereindescribed conduit member comprising an inner tubular wall composed of sections of fire proof material, the ends of the intermediate sections being formed so as to produce conical joints between said sections, the outer ends of the outer pair of sections being straight so as to produce butt joints when the conduit members are assembled, and a covering of insulating material upon said sections, the ends of which insulating material are offset from the straight outer ends of the outer pair of inner members so as to form inner and outer shoulders which are adapted to interengage when the conduit members are assembled.

4. The hereindescribed conduit member comprising an inner tubular wall composed of sections of fire-proof material, the ends of the intermediate sections being formed so as to produce conical joints between said sections, the outer ends of the outer pair of sections being straight so as to produce butt joints when the conduit members are assembled, and a covering of insulating material upon said sections, one end of said covering being extended beyond the corresponding end of the inner tubular wall and the other end of the covering terminating short of the corresponding end of the inner tubular wall so as to produce shouldered butt joints between the conduit members when the same are assembled.

In testimony whereof I hereunto affix my signature in the presence of two witnesses, this 10th day of December, 1915.

JOHN L. FAY.

Witnesses:
M. P. SMITH,
M. A. HANDEL.